US012770960B2

(12) United States Patent
Xu et al.

(10) Patent No.: US 12,770,960 B2
(45) Date of Patent: Oct. 20, 2026

(54) BUTTON BATTERY SHELL AND BUTTON BATTERY

(71) Applicant: SHENZHEN JULI ENERGY CO., LTD, Shenzhen (CN)

(72) Inventors: Zhou Xu, Shenzhen (CN); Tao Li, Shenzhen (CN)

(73) Assignee: SHENZHEN JULI ENERGY CO., LTD, Shenzhen (CN)

( * ) Notice: Subject to any disclaimer, the term of this patent is extended or adjusted under 35 U.S.C. 154(b) by 663 days.

(21) Appl. No.: 18/034,409

(22) PCT Filed: Jan. 6, 2021

(86) PCT No.: PCT/CN2021/070392

§ 371 (c)(1),
(2) Date: Apr. 28, 2023

(87) PCT Pub. No.: WO2022/088503

PCT Pub. Date: May 5, 2022

(65) Prior Publication Data

US 2023/0387514 A1 Nov. 30, 2023

(30) Foreign Application Priority Data

Nov. 2, 2020 (CN) ........................ 202011205642.7

(51) Int. Cl.
*H01M 50/109* (2021.01)
*H01M 10/04* (2006.01)
(Continued)

(52) U.S. Cl.
CPC ..... *H01M 50/109* (2021.01); *H01M 10/0427* (2013.01); *H01M 10/0525* (2013.01);
(Continued)

(58) Field of Classification Search
CPC .......................... H01M 50/109; H01M 50/153
See application file for complete search history.

(56) References Cited

U.S. PATENT DOCUMENTS

2003/0186118 A1* 10/2003 Uyama .............. H01M 50/167 429/174
2004/0197643 A1 10/2004 Buckle
2014/0120412 A1* 5/2014 Nielsen .............. H01M 50/167 361/500

FOREIGN PATENT DOCUMENTS

CN 110600783 A 12/2019
CN 111162209 A 5/2020
(Continued)

OTHER PUBLICATIONS

Machine translation of CN111162209 (Year: 2025).*
(Continued)

*Primary Examiner* — Maria Laios

(57) ABSTRACT

A button battery shell includes a positive electrode metal end cover and a negative electrode metal end cover. The positive electrode metal end cover includes a first bottom cover and a first surrounding wall arranged around one side of the first bottom cover. The negative electrode metal end cover includes a second bottom cover and a second surrounding wall provided around one side of the second bottom cover. The positive electrode metal end cover and the negative electrode metal end cover are arranged opposite to each other. First insulating sleeve are arranged on the first surrounding wall. Second insulating sleeves are arranged on the second surrounding wall. The two insulating sleeves are connected at a connection surface to form an insulating shell having an integrated structure. The insulating shell, the positive electrode metal end cover, and the negative electrode metal end cover form an accommodating cavity.

13 Claims, 2 Drawing Sheets

(51) Int. Cl.

| | |
|---|---|
| ***H01M 10/0525*** | (2010.01) |
| ***H01M 10/0585*** | (2010.01) |
| ***H01M 10/0587*** | (2010.01) |
| ***H01M 50/153*** | (2021.01) |
| ***H01M 50/159*** | (2021.01) |
| ***H01M 50/169*** | (2021.01) |
| ***H01M 50/171*** | (2021.01) |
| ***H01M 50/548*** | (2021.01) |
| ***H01M 50/56*** | (2021.01) |
| ***H01M 50/562*** | (2021.01) |

(52) U.S. Cl.

CPC ... *H01M 10/0585* (2013.01); *H01M 10/0587* (2013.01); *H01M 50/153* (2021.01); *H01M 50/159* (2021.01); *H01M 50/169* (2021.01); *H01M 50/171* (2021.01); *H01M 50/548* (2021.01); *H01M 50/56* (2021.01); *H01M 50/562* (2021.01)

(56) References Cited

FOREIGN PATENT DOCUMENTS

| | | | |
|---|---|---|---|
| CN | 111162210 | A | 5/2020 |
| CN | 111162211 | A | 5/2020 |
| CN | 111211260 | A | 5/2020 |
| CN | 111477791 | A | 7/2020 |
| CN | 111599945 | A | 8/2020 |
| CN | 211404537 | U | 9/2020 |
| CN | 211507752 | U | 9/2020 |
| CN | 214227016 | U | 9/2021 |
| JP | 2007141539 | A | 6/2007 |
| KR | 20090055088 | A | 6/2009 |

OTHER PUBLICATIONS

CNIPA, Office Action issued for Chinese Application No. 202011205642.7, mailed Jun. 10, 2025 (5 pages).

First Office Action from China patent office in a counterpart Chinese patent Application 202011205642.7, malled Dec. 5, 2024(19 pages).

Second Office Action from China patent office in a counterpart Chinese patent Application 202011205642.7, mailed May 10, 2025(10 pages).

International Search Report issued in corresponding International application No. PCT/CN2021/070392, mailed Jul. 26, 2021.

Written Opinion of the International Search Authority in corresponding International application No. PCT/CN2021/070392.

* cited by examiner

BUTTON BATTERY SHELL AND BUTTON BATTERY

TECHNICAL FIELD

The present application belongs to the technical field of batteries, and relates to a button battery shell and a button battery.

BACKGROUND

With the rapid development of the electronic technology and the information industry, a large number of portable power supplies are needed in the production and living. The lithium-ion battery, as an electrochemical energy storage system, has become an indispensable and important technology in the development and utilization of new energy sources because of its outstanding advantages, and the rechargeable lithium-ion battery has been widely studied and applied due to its high energy density, long cycle life and environmental friendliness.

The button battery disclosed in the existing art basically has upper and lower steel sleeves, and an insulating rubber ring is sandwiched between the two steel sleeves to form a seal by clamping the insulating rubber ring tightly. For example, CN210744008U discloses a button cell which includes a shell, a cover plate, an positive electrode module, a negative electrode module and a separator, where the cover plate covers the shell, a sealing ring is arranged between the cover plate and the shell, and one end, close to the bottom of the shell, of the sealing ring extends towards the bottom; the positive electrode module, the separator and the negative electrode module are stacked in the shell, the positive electrode module is attached to the bottom of the shell, and the negative electrode module is attached to the cover plate; the positive electrode module includes a positive electrode ring and a positive electrode sheet, and the positive electrode ring is sleeved on the periphery of the positive electrode sheet; a pressing plate is fixedly arranged on one side, away from the positive electrode sheet, of the positive electrode ring, the pressing plate is located between the sealing ring and the bottom, and one side, close to the sealing ring, of the pressing plate abuts against the sealing ring. For another example, CN110752401A discloses a button battery, where the battery includes a conductive shell body, insulating gaskets, a roll core and an electrolyte, where the conductive shell body is divided into an upper shell and a lower shell, and a sealing ring is arranged between the upper shell and the lower shell; the insulating gaskets are arranged between the roll core and both the upper shell and the lower shell; the roll core includes a negative electrode sheet, a separator and a positive electrode sheet; the separator is arranged between the negative electrode sheet and the positive electrode sheet; the insulating gaskets are sleeved on the separator; a negative electrode tab of the negative electrode sheet or a positive electrode tab of the positive electrode sheet protrude from gaps of the insulating gaskets to achieve the contact connection with the upper shell or the lower shell, respectively. However, the outer shell of the button battery adopts metal materials and has disadvantages such as heavy weight, high processing cost and relatively low specific energy. In addition, the outer metal shell may be expanded and exploded due to factors such as the failure of the outer protective plate, improper overcharge or overdischarge, high-temperature environment and internal short, raising safety concerns. Further, an insulating layer needs to be added to achieve the connection between the upper and lower steel shell sleeve, and the damage of the insulating layer during the encapsulation process may easily lead to short or even failure of the button battery.

Therefore, how to reduce the weight, reduce the cost and improve the safety in use becomes a problem to be solved by the related art.

SUMMARY

An object of the present application is to provide a button battery shell and a button battery. When the button battery shell of the present application is applied to the manufacture of button batteries, the batteries show the advantages of high energy density and high-rate discharge, achieving high-efficiency mechanical manufacturing.

To achieve the above object, the present application adopts the technical solutions below.

In a first aspect, the present application provides a button battery shell, a positive electrode metal end cover and a negative electrode metal end cover. The positive electrode metal end cover includes a first bottom cover and a first surrounding wall provided around one side of the first bottom cover, and the negative electrode metal end cover includes a second bottom cover and a second surrounding wall provided around one side of the second bottom cover.

The positive electrode metal end cover and the negative electrode metal end cover are arranged opposite to each other so that an end portion of the first surrounding wall and an end portion of the second surrounding wall are oppositely arranged at an interval. A first insulating sleeve is arranged on the first surrounding wall, a second insulating sleeve is arranged on the second surrounding wall, and the first insulating sleeve and the second insulating sleeve are connected at a connection surface to form an insulating shell having an integrated structure. The insulating shell, the positive electrode metal end cover and the negative electrode metal end cover form an accommodating cavity for accommodating a battery cell.

In the present application, the expression that the end portion of the first surrounding wall and the end portion of the second surrounding wall are oppositely arranged at an interval means that the end portion of the first surrounding wall and the end portion of the second surrounding wall are arranged opposite to each other and the end portion of the first surrounding wall and the end portion of the second surrounding wall are spaced and not in direct contact.

In the button battery shell of the present application, the positive electrode metal end cover is used to be connected to the positive electrode of the battery cell, and the negative electrode metal end cover is used to be connected to the negative electrode of the battery cell. The button battery shell has a simple structure and is easy to implement. The insulating shell improves the energy density of the button battery (for example, a lithium-ion button battery), ensures good insulation of the button battery shell, and improves the processing reliability.

As an optional solution of the button battery shell of the present application, the first surrounding wall includes a first annular wall and a second annular wall connected sequentially in a direction away from the first bottom cover, the first annular wall and the second annular wall are coaxial, and a diameter of the second annular wall is greater than a diameter of the first annular wall.

Optionally, a connection surface of the first annular wall and the second annular wall is parallel to the first bottom cover.

Optionally, a height of the first annular wall is m, and m is 0.3-3 mm, for example, 0.3 mm, 0.5 mm, 0.8 mm, 1 mm, 1.2 mm, 1.5 mm, 1.7 mm, 2 mm, 2.5 mm or 3 mm, optionally 0.7-1.5 mm.

Optionally, the second surrounding wall includes a third annular wall and a fourth annular wall connected sequentially in a direction away from the second bottom cover, the third annular wall and the fourth annular wall are coaxial, and a diameter of the fourth annular wall is greater than a diameter of the third annular wall.

Optionally, a connection surface of the third annular wall and the fourth annular wall is parallel to the second bottom cover.

Optionally, a height of the third annular wall is n, and n is 0.3-3 mm, for example, 0.3 mm, 0.5 mm, 0.8 mm, 1 mm, 1.2 mm, 1.5 mm, 1.7 mm, 2 mm, 2.5 mm or 3 mm, optionally 0.7-1.5 mm.

Optionally, the first insulating sleeve is arranged on surfaces of an inner side, an outer side and the end portion of the first surrounding wall.

Optionally, the second insulating sleeve is arranged on surfaces of an inner side, an outer side and the end portion of the second surrounding wall.

Optionally, a thickness of the first surrounding wall and a thickness of the second surrounding wall are independently 0.1-0.3 mm, for example, 0.1 mm, 0.2 mm or 0.3 mm.

Optionally, a thickness of a portion of the first insulating sleeve arranged on the inner side of the first surrounding wall and a thickness of a portion of the first insulating sleeve arranged on the outer side of the first surrounding wall are independently 0.1-5 mm, for example, 0.1 mm, 0.2 mm, 0.3 mm, 0.5 mm, 0.6 mm, 0.8 mm, 1 mm, 1.5 mm, 1.7 mm, 2 mm, 2.5 mm, 3 mm, 3.2 mm, 3.5 mm, 4 mm or 5 mm, optionally 0.2-0.8 mm.

Optionally, a thickness of a portion of the second insulating sleeve arranged on the inner side of the second surrounding wall and a thickness of a portion of the second insulating sleeve arranged on the outer side of the second surrounding wall are independently 0.1-5 mm, for example, 0.1 mm, 0.2 mm, 0.3 mm, 0.5 mm, 0.6 mm, 0.8 mm, 1 mm, 1.5 mm, 1.7 mm, 2 mm, 2.5 mm, 3 mm, 3.2 mm, 3.5 mm, 4 mm or 5 mm, optionally 0.2-0.8 mm.

As an optional solution of the button battery shell of the present application, the portion of the first insulating sleeve arranged on the inner side of the first surrounding wall abuts against the connection surface of the first annular wall and the second annular wall, and the portion of the first insulating sleeve arranged on the outer side of the first surrounding wall abuts against an outer side of the first annular wall.

Optionally, the portion of the first insulating sleeve arranged on the inner side of the first surrounding wall coincides with the inner diameter annular surface of the first annular wall.

Optionally, the portion of the second insulating sleeve arranged on the inner side of the second surrounding wall abuts against the connection surface of the third annular wall and the fourth annular wall, and the portion of the second insulating sleeve arranged on the outer side of the second surrounding wall abuts against an outer side of the third annular wall.

Optionally, the portion of the second insulating sleeve arranged on the inner side of the second surrounding wall coincides with the inner diameter annular surface of the third annular wall.

The method by which the first insulating sleeve are arranged on the first surrounding wall and the method by which the second insulating sleeve are arranged on the second surrounding wall are not limited by the present application, and those skilled in the art can prepare the insulating sleeve according to the method disclosed in the existing art as long as the prepared insulating sleeve can achieve good bonding and sealing.

By way of illustration and not limitation, a method of arranging the first insulating sleeve on the first surrounding wall may include injection molding; similarly, a method of arranging the second insulating sleeve on the second surrounding wall may include injection molding.

Optionally, a connection manner for connecting the first insulating sleeve and the second insulating sleeve includes at least one of hot melting, ultrasonic melting, welding or bonding. But the connection manner is not limited to the above-listed manners, and other manners in which a good connection and sealing effect can be achieved are also applicable to the present application.

Optionally, the welding includes at least one of laser welding, ultrasonic welding, induction welding or vibration welding.

Optionally, the bonding includes bonding through glue.

Optionally, the connection surface of the first insulating sleeve and the second insulating sleeve is a mating inclined surface.

Optionally, a material of the positive electrode metal end cover and a material of the negative electrode metal end cover include, but are not limited to, at least one of aluminum, iron or stainless steel, and other commonly used metal shell materials in the art may also be used in the present application.

In the present application, the material of the positive electrode metal end cover and the material of the negative electrode metal end cover may be the same or different.

Optionally, the material of the first insulating sleeve and the material of the second insulating sleeve independently include at least one of polymeric materials, and optionally include, but are not limited to, at least one of polyethylene (PE), polypropylene (PP), polyvinyl chloride, polystyrene, acrylonitrile-butadiene-styrene copolymer, polyformaldehyde, polycarbonate, polymethyl methacrylate or styrene-propylene copolymer, further optionally at least one of polypropylene and polyethylene. The polymeric materials can be naturally softened at a certain temperature (for example, PP and/or PE plastic can be naturally softened at about 150° C.) so that the upper and lower shell structures of the button battery shell are expanded and separated, and slowly deflate to keep safe, thereby improving the safety of the battery.

Optionally, the first insulating sleeve and the second insulating sleeve are provided in different colors to distinguish a positive electrode side from a negative electrode side.

In a second aspect, the present application provides a button battery. The button battery includes the button battery shell described in the first aspect and a battery cell located in the accommodating cavity of the button battery shell.

The specific type of the button battery is not limited by the present application, and the button battery may be, for example, a lithium-ion button battery. The button battery may be a liquid button battery, a semi-solid button battery or an all-solid button battery.

A shape of the button battery is not limited by the present application and may be a cylinder, and the cylinder may be at least one of a circular cylinder, a regular polygonal cylinder or a cylinder with irregular cross-section.

A diameter-to-height ratio of the button battery is not limited by the present application, may be adjusted by those skilled in the art according to actual requirements, and may be more than 1, equal to 1 or less than 1.

The specific type of the battery cell in the button battery is not limited by the present application, and the battery cell may be a wound battery cell, a stacked battery cell or a battery cell manufactured by other processes.

Optionally, for the wound battery cell, the axial direction of the battery cell is perpendicular to the first bottom cover and the second bottom cover.

Optionally, for the stacked battery cell, the stacked surface of the battery cell is parallel to the first bottom cover and the second bottom cover.

The specific structure and composition of the battery cell are not limited by the present application. For example, the battery cell includes a positive electrode, a negative electrode and a separator, and the separator is located between the positive electrode and the negative electrode.

The type of the positive electrode active material in the positive electrode is not limited by the present application, and the positive electrode active material includes, but is not limited to, at least one of lithium cobalt oxide, lithium manganese oxide, lithium iron phosphate, lithium manganese phosphate, a nickel cobalt manganese ternary material or a nickel cobalt aluminum ternary material. Other commonly used positive electrode active materials in the art may also be used in the present application.

The structure of the positive electrode active material is not limited by the present application, and the positive electrode active material may be, for example, a metal oxide of a system of a layered structure, a spinel structure or an olivine structure.

Optionally, the negative electrode active material in the negative electrode includes, but is not limited to, at least one of lithium titanate, titanium dioxide, natural graphite, artificial graphite, carbon fibers, soft carbon, hard carbon, mesocarbon microbeads, elemental silicon, silicon oxides or silicon-carbon composites. Other commonly used negative electrode active materials in the art may also be used in the present application.

Optionally, the separator includes, but is not limited to, at least one of polypropylene, polyethylene or a ceramic separator coated with aluminum oxide. Other commonly used separators in the art may also be used in the present application.

Optionally, the accommodating cavity also contains an electrolyte.

The present application also provides a method for preparing the preceding button battery. The method includes the following steps: a positive electrode metal end cover with a first insulating sleeve and a negative electrode metal end cover with a second insulating sleeve are arranged opposite to each other and sleeved on the outer side of a battery cell separately, and the connection surfaces of the first insulating sleeve and the second insulating sleeve are connected to make them combined to obtain a button battery.

Compared with the existing art, the present application has the beneficial effects described below.

1. The present application provides a button battery shell with an insulating shell and a button battery. Through the arrangement of the insulating shell, the overall weight and cost can be reduced, and by changing the thickness of the insulating shell and/or changing the connection position relationship between the insulating shell and the positive electrode metal end cover and the negative electrode metal end cover, the size of the accommodating space can be increased, thereby improving the volume energy density and prolonging the durability of the button battery.

2. The present application innovatively provides a button battery shell with metal end covers (that is, a positive electrode metal end cover and a negative electrode metal end cover) and an insulating shell, ensuring good end face conductivity, mechanical stability and thermal stability of the button battery and comprehensively improving the safety of the lithium-ion button battery.

3. The lithium-ion button battery provided by the present application has the advantages of a controllable structure, simple design and low cost. The number of shell components is reduced from three in the existing art to two, and the button battery shell can be sealed by welding or hot melting so that the production difficulty is reduced, the processing accuracy required by the shell is reduced, the processing reliability is improved, and the symmetry of the product becomes better. The commercialization of the button battery shell of the present application can be easily achieved.

Reference list: 1—positive electrode metal end cover; 11—first bottom cover; 12—first surrounding wall; 121—first annular wall; 122—second annular wall; 2—negative electrode metal end cover; 21—second bottom cover; 22—second surrounding wall; 221—third annular wall; 222—fourth annular wall; 3—first insulating sleeve; 4—second insulating sleeve; 5—insulating shell; 6—accommodating cavity; 7—pit.

DETAILED DESCRIPTION

It is to be understood that in the description of the present application, orientations or position relations indicated by terms such as "center", "longitudinal", "lateral", "upper", "lower" "front", "back", "left", "right", "vertical", "horizontal", "top", "bottom", "side", "in" and "out" are those based on the drawings. These orientations or position relations are intended to facilitate and simplify the description of the present application and not to indicate or imply that a device or element referred to must have a particular orientation or must be constructed or operated in a particular orientation. Thus, these orientations or position relations are not to be construed as limiting the present application.

It is to be noted that in the description of the present application, unless otherwise expressly specified and limited, the term "arranged", "connected to each other" or "connected" should be construed in a broad sense as securely connected, detachably connected or integrally connected; mechanically connected or electrically connected; directly connected to each other or indirectly connected to each other via an intermediary; or communicated between two components. For those of ordinary skill in the art, specific meanings of the preceding terms in the present application may be construed according to specific circumstances.

The technical solutions of the present application are further described hereinafter through embodiments in conjunction with the drawings.

Embodiments are further described below to illustrate the present application in detail. The embodiments described below with reference to the drawings are exemplary, intended to explain the present application, and not to be construed as limiting the present application. The specific process parameters in the following examples are also an example within suitable ranges, that is, those skilled in the art can make a choice within suitable ranges through the description herein and are not limited to the specific choices of the following examples.

Figure 1:
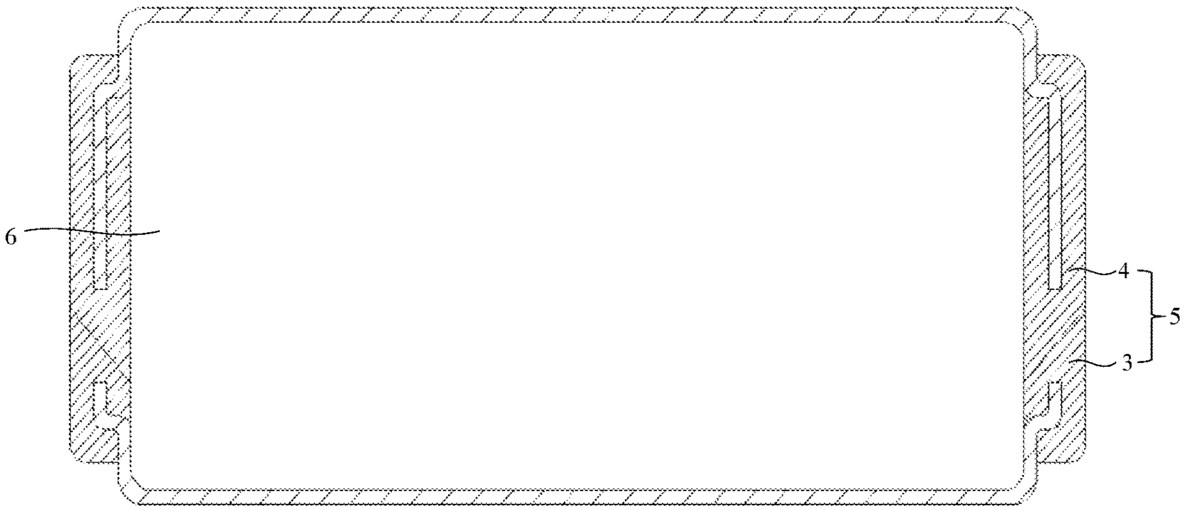
FIG. 1 is a front sectional view of a button battery according to Embodiment one.

In a specific embodiment, the present application provides a button battery shell (whose front sectional view is shown in FIG. 1). The button battery shell includes a positive electrode metal end cover 1 and a negative electrode metal end cover 2. The positive electrode metal end cover 1 includes a first bottom cover 11 and a first surrounding wall 12 provided around one side of the first bottom cover 11. The negative electrode metal end cover 2 includes a second bottom cover 21 and a second surrounding wall 22 provided around one side of the second bottom cover 21. The positive electrode metal end cover 1 and the negative electrode metal end cover 2 are arranged opposite to each other so that an end portion of the first surrounding wall 12 and an end portion of the second surrounding wall 22 are oppositely arranged at an interval. A first insulating sleeve 3 is arranged on the first surrounding wall 12, a second insulating sleeve 4 is arranged on the second surrounding wall 22, and the first insulating sleeve 3 and the second insulating sleeve 4 are connected at a connection surface to form an insulating shell 5 having an integrated structure. The insulating shell 5, the positive electrode metal end cover 4 and the negative electrode metal end cover 2 form an accommodating cavity 6 for accommodating a battery cell.

The first surrounding wall 12 includes a first annular wall 121 and a second annular wall 122 connected sequentially in a direction away from the first bottom cover 11, the first annular wall 121 and the second annular wall 122 are coaxial, and a diameter of the second annular wall 122 is greater than a diameter of the first annular wall 121.

The second surrounding wall 22 includes a third annular wall 221 and a fourth annular wall 222 connected sequentially in a direction away from the second bottom cover 21, the third annular wall 221 and the fourth annular wall 222 are coaxial, and a diameter of the fourth annular wall 222 is greater than a diameter of the third annular wall 221.

The first insulating sleeve 3 is arranged on surfaces of an inner side, an outer side and the end portion of the first surrounding wall 12.

The second insulating sleeve 4 is arranged on surfaces of an inner side, an outer side and the end portion of the second surrounding wall 22.

The portion of the first insulating sleeve 3 arranged on the inner side of the first surrounding wall 12 abuts against a connection surface of the first annular wall 121 and the second annular wall 122, and the portion of the first insulating sleeve 3 arranged on the outer side of the first surrounding wall 12 abuts against an outer side of the first annular wall 121.

The portion of the second insulating sleeve 4 arranged on the inner side of the second surrounding wall 22 abuts against a connection surface of the third annular wall 221 and the fourth annular wall 222, and the portion of the second insulating sleeve 4 arranged on the outer side of the second surrounding wall 22 abuts against an outer side of the third annular wall 221.

In an embodiment, a connection surface of the first annular wall 121 and the second annular wall 122 is parallel to the first bottom cover 11.

In an embodiment, a connection surface of the third annular wall 221 and the fourth annular wall 222 is parallel to the second bottom cover 21.

In an embodiment, the portion of the first insulating sleeve 3 arranged on the inner side of the first surrounding wall 12 coincides with the inner diameter annular surface of the first annular wall 121.

In an embodiment, the portion of the second insulating sleeve 4 arranged on the inner side of the second surrounding wall 22 coincides with the inner diameter annular surface of the third annular wall 221.

In an embodiment, a method of arranging the first insulating sleeve 3 on the first surrounding wall 12 is injection molding.

In an embodiment, a method of arranging the second insulating sleeve 4 on the second surrounding wall 22 is injection molding.

In an embodiment, a connection manner for connecting the first insulating sleeve and the second insulating sleeve includes at least one of hot melting, ultrasonic melting, welding or bonding. The welding includes at least one of laser welding, ultrasonic welding, induction welding or vibration welding, and the bonding includes bonding through glue.

In an embodiment, a connection surface of the first insulating sleeve 3 and the second insulating sleeve 4 is a mating inclined surface.

In an embodiment, a material of the positive electrode metal end cover 1 and a material of the negative electrode metal end cover 2 independently include at least one of aluminum, iron or stainless steel. The material of the positive electrode metal end cover 1 and the material of the negative electrode metal end cover 2 are the same or different.

In an embodiment, a material of the first insulating sleeve 3 and a material of the second insulating sleeve 4 independently include at least one of polymeric materials, optionally at least one of polyethylene, polypropylene, polyvinyl chloride, polystyrene, acrylonitrile-butadiene-styrene copolymer, polyformaldehyde, polycarbonate, polymethyl methacrylate or styrene-propylene copolymer, further optionally at least one of polypropylene and polyethylene.

In an embodiment, the first insulating sleeve 3 and the second insulating sleeve 4 are provided in different colors to distinguish a positive electrode side from a negative electrode side.

Further, a height of the first annular wall 121 is m, and m is 0.3-3 mm, optionally 0.7-1.5 mm.

Further, a height of the third annular wall 221 is n, and n is 0.3-3 mm, optionally 0.7-1.5 mm.

Further, a thickness of the first surrounding wall 12 and a thickness of the second surrounding wall 22 are independently 0.1-0.3 mm.

Further, a thickness of a portion of the first insulating sleeve 3 arranged on the inner side of the first surrounding wall 12 and a thickness of a portion of the first insulating sleeve 3 arranged on the outer side of the first surrounding wall 12 are independently 0.1-5 mm, optionally 0.2-0.8 mm.

Further, a thickness of a portion of the second insulating sleeve 4 arranged on the inner side of the second surrounding wall 22 and a thickness of a portion of the second insulating sleeve 4 arranged on the outer side of the second surrounding wall 22 are independently 0.1-5 mm, optionally 0.2-0.8 mm.

In a specific embodiment, the present application provides a button battery. The button battery includes the preceding button battery shell and a battery cell located in the accommodating cavity of the button battery shell.

In an embodiment, the button battery is a lithium-ion button battery, and may be a liquid button battery, a semi-solid button battery or an all-solid button battery.

In an embodiment, a diameter-to-height ratio of the button battery is more than 1, equal to 1 or less than 1.

In an embodiment, the battery cell is a wound battery cell and/or a stacked battery cell.

In an embodiment, the battery cell includes a positive electrode, a negative electrode and a separator, and the separator is located between the positive electrode and the negative electrode.

In an embodiment, the positive electrode includes a positive electrode material layer, and the positive electrode material layer includes a positive electrode active material, a conductive agent and a binder. The positive electrode active material includes at least one of lithium cobalt oxide, lithium manganese oxide, lithium iron phosphate, lithium manganese phosphate, a nickel cobalt manganese ternary material or a nickel cobalt aluminum ternary material, the conductive agent includes acetylene black, and the binder includes polyvinylidene fluoride.

In an embodiment, the negative electrode includes a negative electrode material layer, and the negative electrode material layer includes a negative electrode active material and a binder. The binder includes polyvinylidene fluoride and/or styrene-butadiene rubber.

In an embodiment, the negative electrode active material includes at least one of lithium titanate, titanium dioxide, natural graphite, artificial graphite, carbon fibers, soft carbon, hard carbon, mesocarbon microbeads, elemental silicon, silicon oxides or silicon-carbon composites.

In an embodiment, the separator includes at least one of polypropylene, polyethylene or a ceramic separator coated with aluminum oxide.

Embodiment 1

Figure 2:
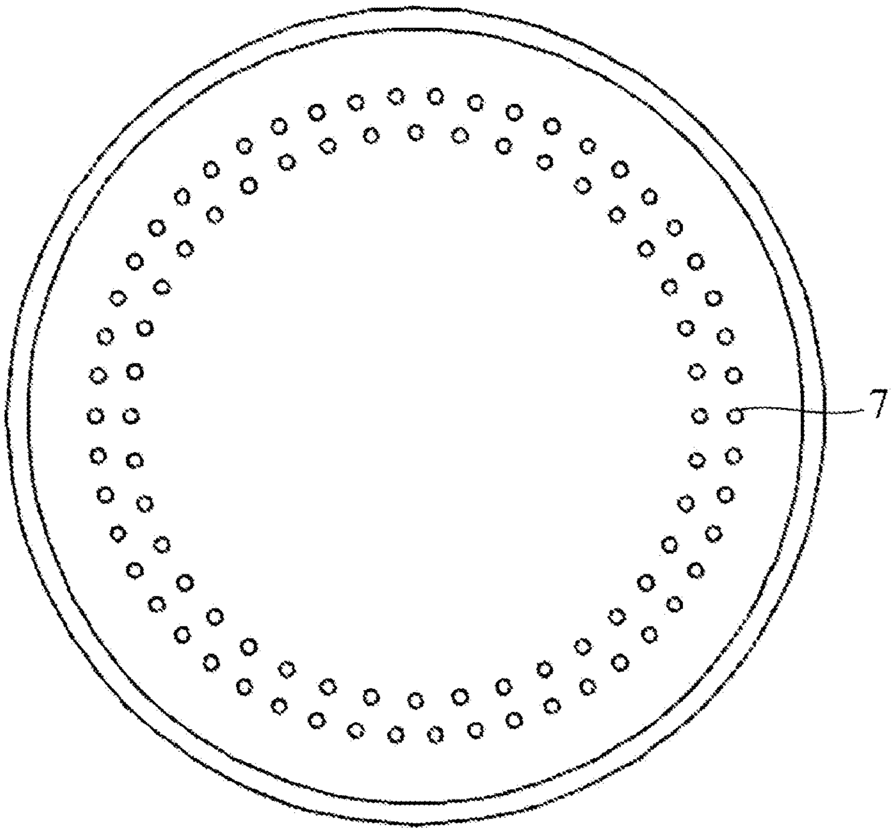
FIG. 2 is a top view of the button battery according to Embodiment one.
Figure 3:
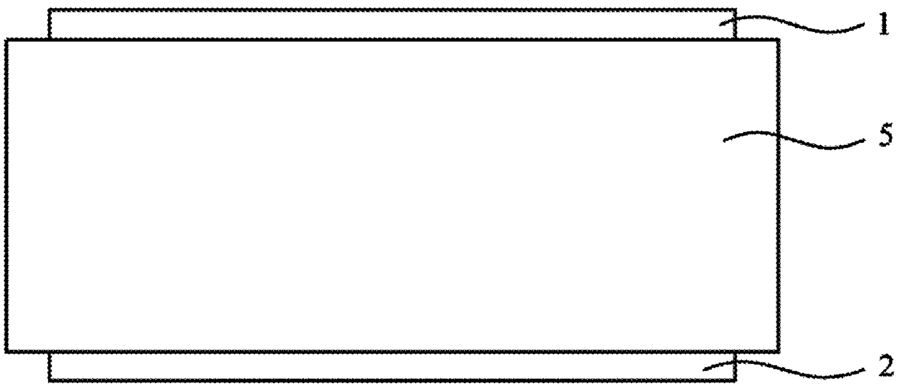
FIG. 3 is a front view of the button battery according to Embodiment one.

This embodiment provides a button battery shell (whose front sectional view, top view and front view are shown in FIG. 1, FIG. 2 and FIG. 3, respectively). The button battery shell includes a positive electrode metal end cover 1 and a negative electrode metal end cover 2. The positive electrode metal end cover I includes a first bottom cover 11 and a first surrounding wall 12 provided around one side of the first bottom cover 11, and the negative electrode metal end cover 2 includes a second bottom cover 21 and a second surrounding wall 22 provided around one side of the second bottom cover 21.

Figure 4:
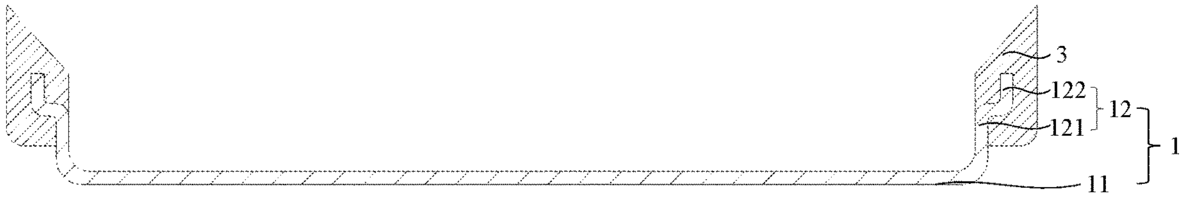
FIG. 4 is a front sectional view of a positive electrode metal end cover with a first insulating sleeve according to Embodiment one.
Figure 5:
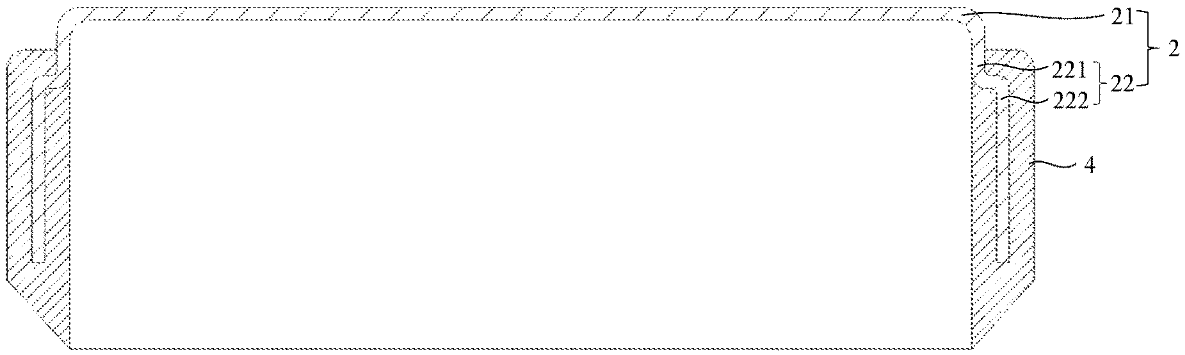
FIG. 5 is a front sectional view of a negative electrode metal end cover with a second insulating sleeve according to Embodiment one.

The positive electrode metal end cover 1 and the negative electrode metal end cover 2 are arranged opposite to each other so that an end portion of the first surrounding wall 12 and an end portion of the second surrounding wall 22 are oppositely arranged at an interval. A first insulating sleeve 3 (with reference to FIG. 4) is formed by injection molding on the first surrounding wall 12, and a second insulating sleeve 4 (with reference to FIG. 5) is formed by injection molding on the second surrounding wall 22. A connection surface of the first insulating sleeve 3 and the second insulating sleeve 4 is a mating inclined surface, and the first insulating sleeve 3 and the second insulating sleeve 4 are welded by laser welding at the inclined surface to form an insulating shell 5 having an integrated structure. The insulating shell 5, the positive electrode metal end cover 1 and the negative electrode metal end cover 2 form an accommodating cavity 6 for accommodating a battery cell.

The first surrounding wall 12 includes a first annular wall 121 and a second annular wall 122 connected sequentially in a direction away from the first bottom cover 11, and the first annular wall 121 and the second annular wall 122 are coaxial. A diameter of the second annular wall 122 is greater than a diameter of the first annular wall 121. The connection surface of the first annular wall 121 and the second annular wall 122 is parallel to the first bottom cover 11.

The second surrounding wall 22 includes a third annular wall 221 and a fourth annular wall 222 connected sequentially in a direction away from the second bottom cover 21, and the third annular wall 221 and the fourth annular wall 222 are coaxial. A diameter of the fourth annular wall 222 is greater than a diameter of the third annular wall 221. The connection surface of the third annular wall 221 and the fourth annular wall 222 is parallel to the second bottom cover 21.

The first insulating sleeve 3 is arranged on surfaces of an inner side, an outer side and the end portion of the first surrounding wall 12. The portion of the first insulating sleeve 3 arranged on the inner side of the first surrounding wall 12 abuts against the connection surface of the first annular wall 121 and the second annular wall 122 and coincides with the inner diameter annular surface of the first annular wall 121, and the portion of the first insulating sleeve 3 arranged on the outer side of the first surrounding wall 12 abuts against an outer side of the first annular wall 121.

The second insulating sleeve 4 is arranged on surfaces of an inner side, an outer side and the end portion of the second surrounding wall 22. The portion of the second insulating sleeve 4 arranged on the inner side of the second surrounding wall 22 abuts against the connection surface of the third annular wall 221 and the fourth annular wall 222 and coincides with the inner diameter annular surface of the third annular wall 221, and the portion of the second insulating sleeve 4 arranged on the outer side of the second surrounding wall 22 abuts against an outer side of the third annular wall 221.

The outer surface of the negative electrode metal end cover 2 is provided with two circles of pits 7. The circumferential diameter of the pits 7 of the inner circle is 8 mm, and the circumferential diameter of the pits 7 of the outer circle is 9 mm. The pits 7 are evenly distributed in the circumferential direction, and the depth of the pits 7 is 0.02 mm.

In this embodiment, the materials of both the positive electrode metal end cover I and the negative electrode metal end cover 2 are stainless steel. The material of the first insulating sleeve 3 is a mixture of PE plastic and an elastomer whose mass ratio is 8:2, and the color of the first insulating sleeve 3 is white. The material of the second insulating sleeve 4 is a mixture of PP plastic and an elastomer whose mass ratio is 8:2, and the color of the second insulating sleeve 4 is black. The outer diameters of the first bottom cover 11 and the second bottom cover 21 are both 10.9 mm. The inner diameters of the first annular wall 121 and the third annular wall 221 are both 10.6 mm. The heights of the first annular wall 121 and the third annular wall 221 are both 0.8 mm. The thicknesses of the portions of the first insulating sleeve 3 arranged on the inner side and the outer side of the first surrounding wall 11 are both 0.29 mm. The thicknesses of the portions of the second insulating sleeve 4 arranged on the inner side and the outer side of the second surrounding wall 21 are both 0.29 mm. The thicknesses of the first surrounding wall 12 and the second surrounding wall 21 are both 0.15 mm. The distance between the outer surface of the positive electrode metal end cover 1 and the outer surface of the negative electrode metal end cover 2 is 5.3 mm.

This embodiment provides a button battery. The button battery is a cylindrical lithium-ion button battery with a diameter-to-height ratio greater than 1 and includes the preceding button battery shell and a battery cell located in the accommodating cavity 6 of the button battery shell. The battery cell is a wound battery and includes a positive electrode, a negative electrode and a separator. The positive electrode is welded with the first bottom cover 11, and the negative electrode is welded with the second bottom cover 21.

Embodiment 2

This embodiment provides a button battery shell (whose front sectional view, top view and front view are shown in FIG. 1, FIG. 2 and FIG. 3, respectively). The button battery shell includes a positive electrode metal end cover 1 and a negative electrode metal end cover 2. The positive electrode metal end cover 1 includes a first bottom cover 11 and a first surrounding wall 12 provided around one side of the first bottom cover 11, and the negative electrode metal end cover 2 includes a second bottom cover 21 and a second surrounding wall 22 provided around one side of the second bottom cover 21.

The positive electrode metal end cover 1 and the negative electrode metal end cover 2 are arranged opposite to each other so that an end portion of the first surrounding wall 12 and an end portion of the second surrounding wall 22 are oppositely arranged at an interval. A first insulating sleeve 3 (with reference to FIG. 4) is formed by injection molding on the first surrounding wall 12, and second insulating sleeve 4 (with reference to FIG. 5) is formed by injection molding on the second surrounding wall 22. A connection surface of the first insulating sleeve 3 and the second insulating sleeve 4 is a mating inclined surface, and the first insulating sleeve 3 and the second insulating sleeve 4 are bonded through glue at the inclined surface to form an insulating shell 5 having an integrated structure. The insulating shell 5, the positive electrode metal end cover 1 and the negative electrode metal end cover 2 form an accommodating cavity 6 for accommodating a battery cell.

The first surrounding wall 12 includes a first annular wall 121 and a second annular wall 122 connected sequentially in a direction away from the first bottom cover 11, and the first annular wall 121 and the second annular wall 122 are coaxial. A diameter of the second annular wall 122 is greater than a diameter of the first annular wall 121. A connection surface of the first annular wall 121 and the second annular wall 122 is parallel to the first bottom cover 11.

The second surrounding wall 22 includes a third annular wall 221 and a fourth annular wall 222 connected sequentially in a direction away from the second bottom cover 21, and the third annular wall 221 and the fourth annular wall 222 are coaxial. A diameter of the fourth annular wall 222 is greater than a diameter of the third annular wall 221. A connection surface of the third annular wall 221 and the fourth annular wall 222 is parallel to the second bottom cover 21.

The first insulating sleeve 3 is arranged on surfaces of an inner side, an outer side and the end portion of the first surrounding wall 12. The portion of the first insulating sleeve 3 arranged on the inner side of the first surrounding wall 12 abuts against the connection surface of the first annular wall 121 and the second annular wall 122 and coincides with the inner diameter annular surface of the first annular wall 121, and the portion of the first insulating sleeve 3 arranged on the outer side of the first surrounding wall 12 abuts against an outer side of the first annular wall 121.

The second insulating sleeve 4 is arranged on surfaces of an inner side, an outer side and the end portion of the second surrounding wall 22. The portion of the second insulating sleeve 4 arranged on the inner side of the second surrounding wall 22 abuts against the connection surface of the third annular wall 221 and the fourth annular wall 222 and coincides with the inner diameter annular surface of the third annular wall 221, and the portion of the second insulating sleeve 4 arranged on the outer side of the second surrounding wall 22 abuts against an outer side of the third annular wall 221.

In this embodiment, the materials of both the positive electrode metal end cover 1 and the negative electrode metal end cover 2 are aluminum. The materials of the first insulating sleeve 3 and the second insulating sleeve 4 are both PP plastic. Outer diameters of the first bottom cover 11 and the second bottom cover 21 are both 10.9 mm. Inner diameters of the first annular wall 121 and the third annular wall 221 are both 10.6 mm. A height of the first annular wall 121 is 0.8 mm, and a height of the third annular wall 221 is 0.7 mm. Thicknesses of the portions of the first insulating sleeve 3 arranged on the inner side and the outer side of the first surrounding wall 11 are both 0.32 mm. Thicknesses of the portions of the second insulating sleeve 4 arranged on the inner side and the outer side of the second surrounding wall 21 are both 0.32 mm. Thicknesses of the first surrounding wall 12 and the second surrounding wall 21 are both 0.2 mm. A distance between the outer surface of the positive electrode metal end cover 1 and the outer surface of the negative electrode metal end cover 2 is 5.5 mm.

This embodiment provides a button battery. The button battery is a cubic lithium-ion button battery with a diameter-to-height ratio less than 1 and includes the preceding button battery shell and a battery cell located in the accommodating cavity 6 of the button battery shell. The battery cell is a stacked battery and includes a positive electrode, a negative electrode and a separator. The positive electrode is welded with the first bottom cover 11, and the negative electrode is welded with the second bottom cover 21.

The foregoing are typical embodiments of the present application, and various other changes are readily made without departing from the precise scope described in the claims of the present application.

The applicant has stated that although the detailed method of the present application is described through the embodiments described above, the present application is not limited to the detailed method described above, which means that the implementation of the present application does not necessarily depend on the detailed method described above.

What is claimed is:

1. A button battery shell, comprising: a positive electrode metal end cover and a negative electrode metal end cover, wherein the positive electrode metal end cover comprises a first bottom cover and a first surrounding wall provided around one side of the first bottom cover, and the negative electrode metal end cover comprises a second bottom cover and a second surrounding wall provided around one side of the second bottom cover;

wherein the positive electrode metal end cover and the negative electrode metal end cover are arranged opposite to each other so that an end portion of the first surrounding wall and an end portion of the second surrounding wall are oppositely arranged at an interval, a first insulating sleeve is arranged on the first surrounding wall, a second insulating sleeve is arranged on the second surrounding wall, the first insulating sleeve and the second insulating sleeve are connected at a connection surface to form an insulating shell having an integrated structure, and the insulating shell, the positive electrode metal end cover and the negative electrode metal end cover form an accommodating cavity for accommodating a battery cell;

wherein the first surrounding wall comprises a first annular wall and a second annular wall connected sequentially in a direction away from the first bottom cover, the first annular wall and the second annular wall are coaxial; and the second surrounding wall comprises a third annular wall and a fourth annular wall connected sequentially in a direction away from the second bottom cover, the third annular wall and the fourth annular wall are coaxial;

wherein inner diameters of the first annular wall and the third annular wall are equal;

wherein a portion of the first insulating sleeve arranged on the inner side of the first surrounding wall coincides with an inner diameter annular surface of the first annular wall;

wherein a portion of the second insulating sleeve arranged on the inner side of the second surrounding wall coincides with an inner diameter annular surface of the third annular wall.

2. The button battery shell according to claim 1, wherein a diameter of the second annular wall is greater than a diameter of the first annular wall.

3. The button battery shell according to claim 2, wherein a connection surface of the first annular wall and the second annular wall is parallel to the first bottom cover.

4. The button battery shell according to claim 2, wherein a height of the first annular wall is m, and m is in a range of 0.7-1.5 mm;

a diameter of the fourth annular wall is greater than a diameter of the third annular wall;

a connection surface of the third annular wall and the fourth annular wall is parallel to the second bottom cover;

optionally, a height of the third annular wall is n, and n is in a range of 0.7-1.5 mm.

5. The button battery shell according to claim 1, wherein the first insulating sleeve is arranged on surfaces of an inner side, an outer side and the end portion of the first surrounding wall;

the second insulating sleeve is arranged on surfaces of an inner side, an outer side and the end portion of the second surrounding wall;

a thickness of the first surrounding wall and a thickness of the second surrounding wall are independently in a range of 0.1-0.3 mm;

a thickness of a portion of the first insulating sleeve arranged on the inner side of the first surrounding wall and a thickness of a portion of the first insulating sleeve arranged on the outer side of the first surrounding wall are independently in a range of 0.2-0.8 mm;

a thickness of a portion of the second insulating sleeve arranged on the inner side of the second surrounding wall and a thickness of a portion of the second insulating sleeve arranged on the outer side of the second surrounding wall are independently 0.1-5 mm.

6. The button battery shell according to claim 5, wherein a portion of the first insulating sleeve arranged on the inner side of the first surrounding wall abuts against the connection surface of the first annular wall and the second annular wall, and a portion of the first insulating sleeve arranged on the outer side of the first surrounding wall abuts against an outer side of the first annular wall;

a portion of the second insulating sleeve arranged on the inner side of the second surrounding wall abuts against a connection surface of the third annular wall and the fourth annular wall, and a portion of the second insulating sleeve arranged on the outer side of the second surrounding wall abuts against an outer side of the third annular wall.

7. The button battery shell according to claim 1, wherein a method of arranging the first insulating sleeve on the first surrounding wall comprises injection molding;

a method of arranging the second insulating sleeve on the second surrounding wall comprises injection molding.

8. The button battery shell according to claim 1, wherein a connection manner for connecting the first insulating sleeve and the second insulating sleeve comprises at least one of hot melting, ultrasonic melting, welding or bonding;

the welding comprises at least one of laser welding, ultrasonic welding, induction welding or vibration welding;

the bonding comprises bonding through glue.

9. The button battery shell according to claim 1, wherein the connection surface of the first insulating sleeve and the second insulating sleeve is a mating inclined surface.

10. The button battery shell according to claim 1, wherein a material of the positive electrode metal end cover and a material of the negative electrode metal end cover independently comprise at least one of aluminum, iron or stainless steel;

the material of the positive electrode metal end cover and the material of the negative electrode metal end cover are the same or different.

11. The button battery shell according to claim 1, wherein a material of the first insulating sleeve and a material of the second insulating sleeve independently comprise at least one of polymeric materials;

the first insulating sleeve and the second insulating sleeve are provided in different colors to distinguish a positive electrode side from a negative electrode side.

12. A button battery, comprising: the button battery shell according to claim 1 and a battery cell located in the accommodating cavity of the button battery shell;

wherein the button battery comprises a lithium-ion button battery;

the button battery comprises a liquid button battery, a semi-solid button battery or an all-solid button battery;

a shape of the button battery comprises a cylinder, and the cylinder comprises at least one of a circular cylinder, a regular polygonal cylinder or a cylinder with irregular cross-section;

a diameter-to-height ratio of the button battery is more than 1, equal to 1 or less than 1;

the battery cell is a wound battery cell or a stacked battery cell;

for the wound battery cell, an axial direction of the battery cell is perpendicular to the first bottom cover and the second bottom cover;

for the stacked battery cell, a stacked surface of the battery cell is parallel to the first bottom cover and the second bottom cover.

13. The button battery shell according to claim 11, wherein a material of the first insulating sleeve and a material of the second insulating sleeve independently comprise at least one of polyethylene, polypropylene, polyvinyl chloride, polystyrene, acrylonitrile-butadiene-styrene copolymer, polyformaldehyde, polycarbonate, polymethyl methacrylate or styrene-propylene copolymer.

* * * * *